June 1, 1965 C. E. STROBURG ETAL 3,186,548
LEVELING DEVICE FOR THE CHAFFER AND SIEVE ON A COMBINE
Filed April 30, 1962 4 Sheets-Sheet 1
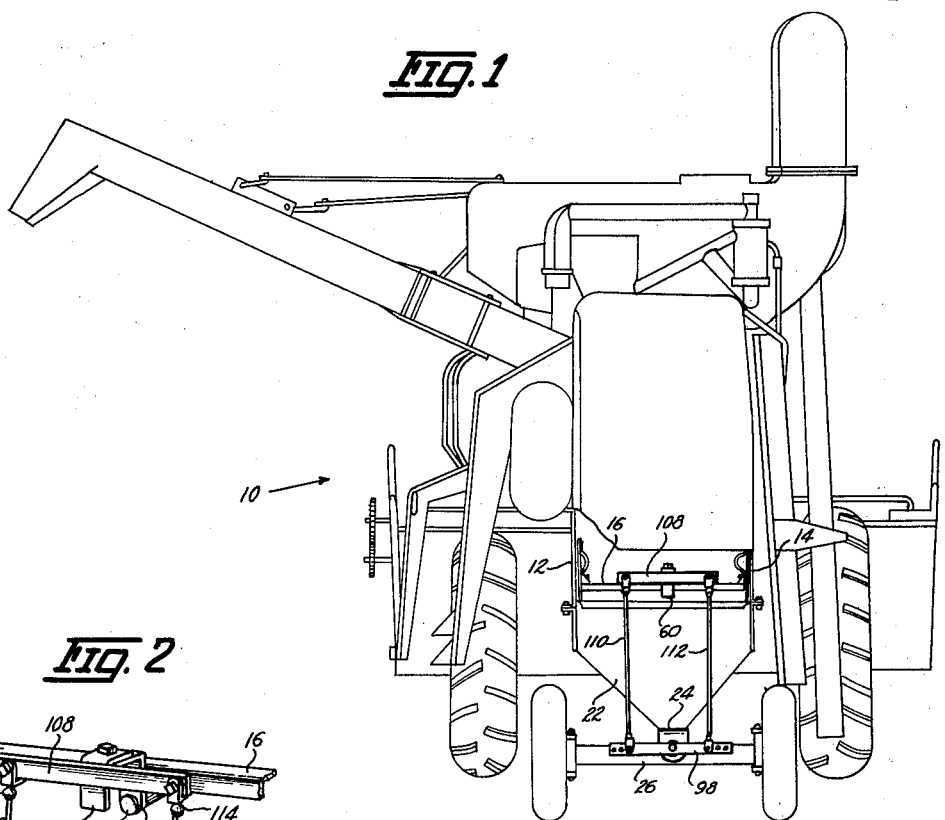
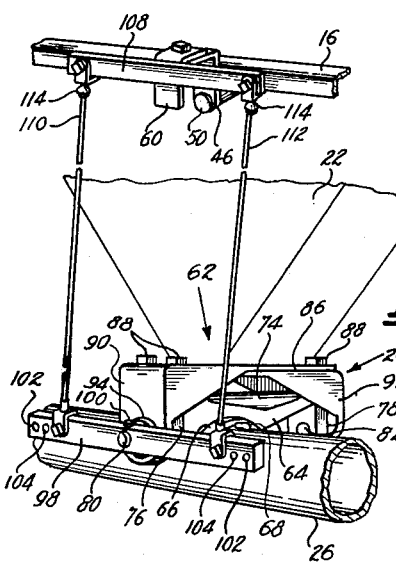
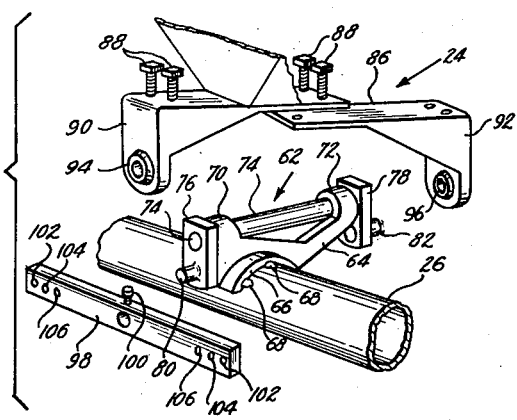
INVENTORS.
CLARK E. STROBURG
ELDON L. STROBURG
BY
ATTORNEY.

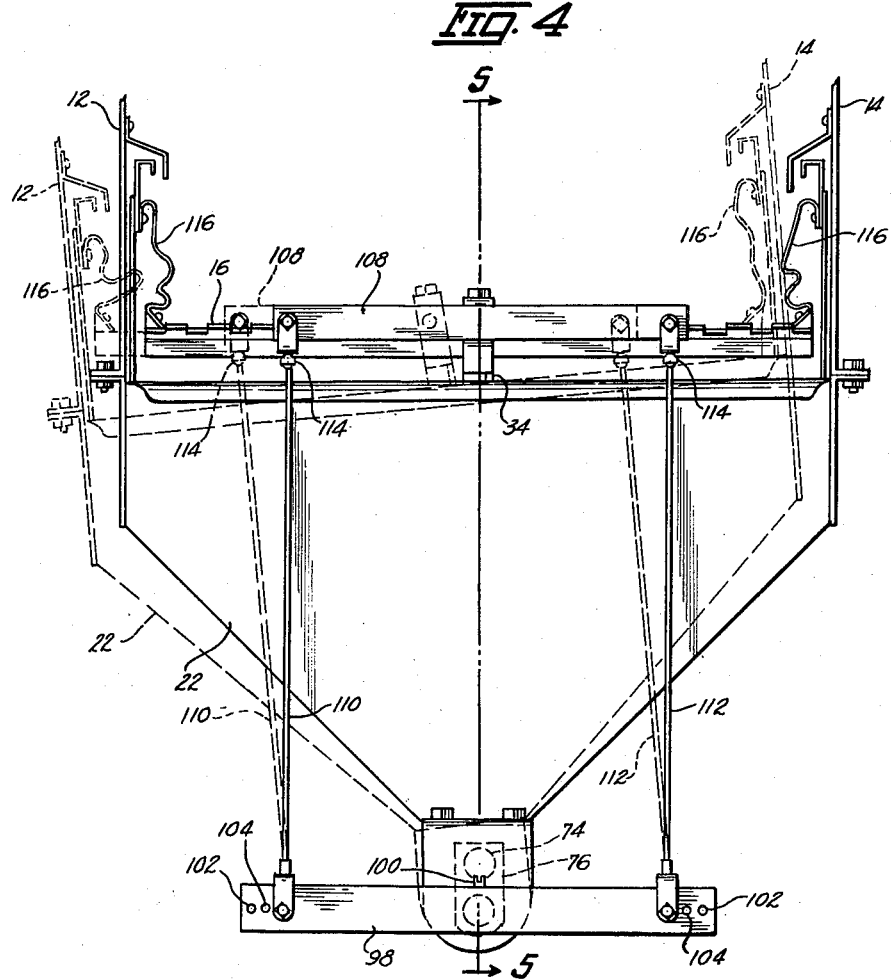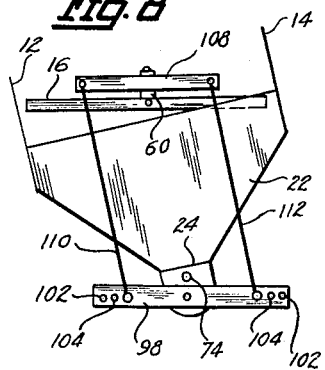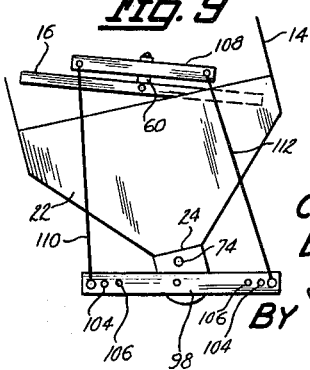

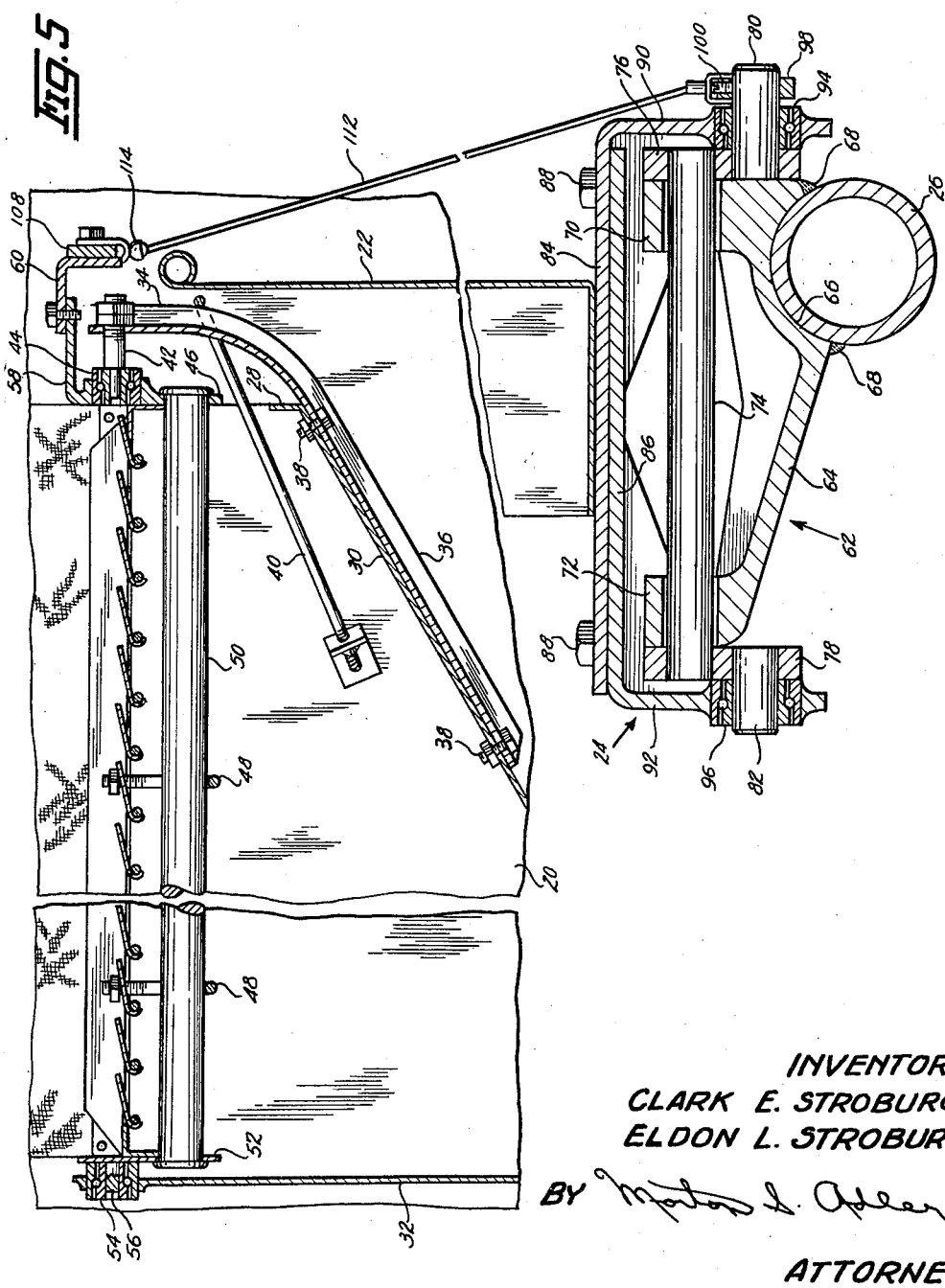

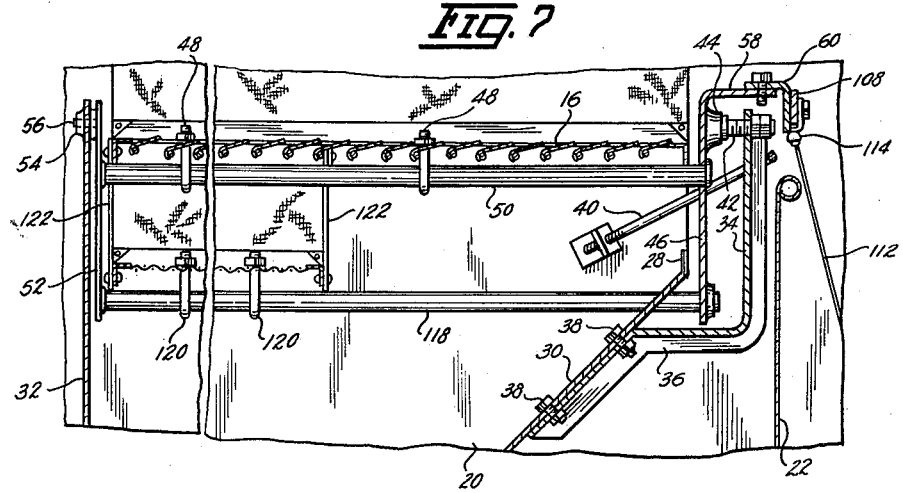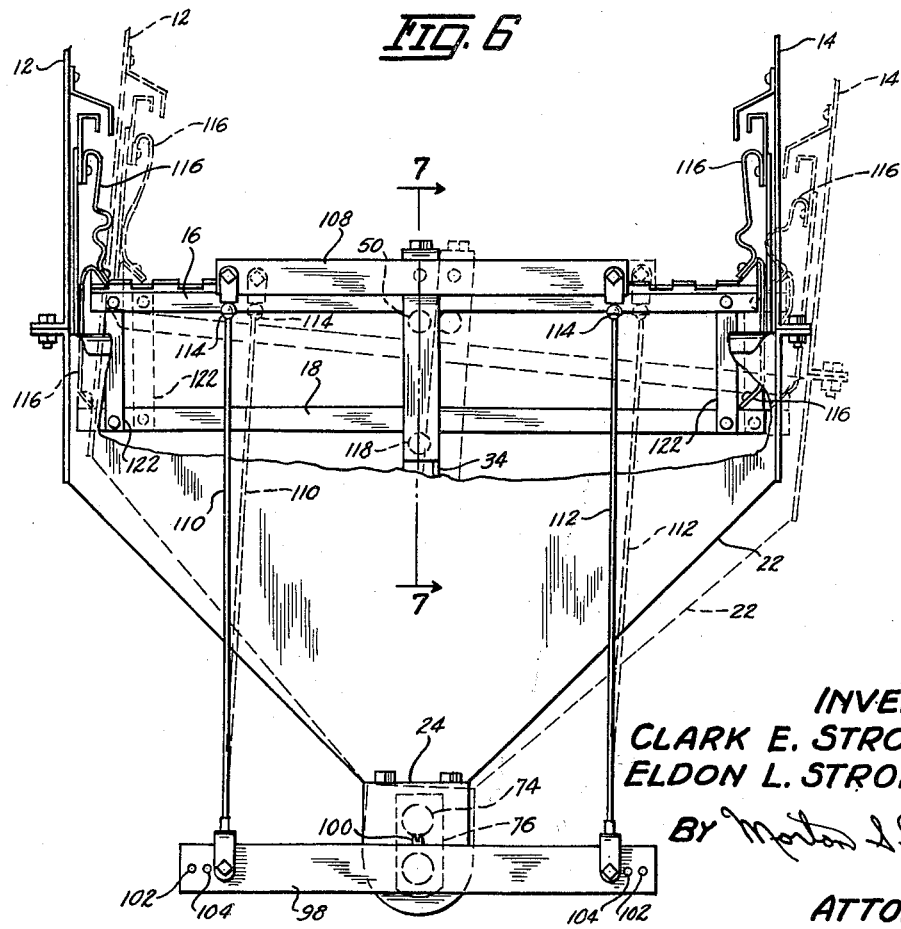

United States Patent Office 3,186,548
Patented June 1, 1965

3,186,548
LEVELING DEVICE FOR THE CHAFFER AND SIEVE ON A COMBINE
Clark E. Stroburg and Eldon L. Stroburg, Blockton, Iowa
Filed Apr. 30, 1962, Ser. No. 191,073
10 Claims. (Cl. 209—416)

This is a continuation-in-part of our copending application under the same title Serial Number 149,915, now abandoned, filed November 3, 1961.

This invention relates to a self-leveling device for the chaffer and sieve on a combine.

In the operation of a combine as the straw and grain moves from front to rear through a series of operations calculated to separate the grain from the chaff, most of the grain will be separated at approximately a midway point in its travel through the combine. However at the rearward end of the combine there is found certain mechanism to separate grain which may have escaped separation previously and included in such mechanism is what is known as the chaffer and sieve and sometimes referred to as the adjustable chaffer and adjustable sieve because of certain construction by which the size of the openings or passageways can be adjusted. It is with these latter two parts that this invention is more particularly concerned.

The chaffer and sieve, as is well known, serve as a separating or screening means to separate the fine grain from the rough chaff and both are usually horizontally mounted in parallel vertical spaced relationships in suitable guides, tracks or brackets at the rear of the combine with the chaffer being uppermost. Means are provided to agitate or reciprocate both the chaffer and sieve in a horizontal plane as the grain is sifted therethrough.

It will be appreciated that all terrain over which the combine is run is not of a level nature so that at times, and actually quite frequently, the combine is used on slopes of varying degrees. Obviously in such situations, the combine frame or chassis is moving at a tilted angle and consequently the chaffer and sieve being mounted thereto are correspondingly tilted so as to present a slanted or inclined surface in the path of the chaff and grain. In this respect it has been our observation that the efficiency of operation of the chaffer and sieve is materially greater when functioning on a horizontal or level plane than when operating in a tilted or slanted position relative to a level plane, and therefore one of the principal objects contemplated by this invention is to provide a means to maintain the chaffer and sieve on a level plane irrespective of the slope of the terrain over which a combine is being used.

A further object is to provide a leveling device to maintain the chaffer and sieve on a combine on a horizontal or level plane irrespective of any tilted position of the combine frame or chassis which it might assume when operated for its intended purposes.

Still another object inhering herein is the provision of a leveling device of the above class which operates continuously and automatically in response to deviations by the combine frame or chassis from a level plane.

A still further object is to provide a leveling device as characterized which will operate independently of any power connection to the combine.

Still another object herein is to provide certain adjustable features in the leveling device characterized which will permit, if desired, of affecting a slight angular tilt of the chaffer and sieve away from a horizontal plane in the opposite direction to the direction of tilt of the combine.

Other objects and advantages of this invention reside in the details of construction and correlation of the various parts and will be apparent as the description proceeds.

This invention consists of novel parts and combination of parts to be hereinafter described whereby the objects set forth are attained, as poined out in the claims, and illustrated in the accompanying drawings, in which:

FIG. 1 is a rear elevational view of a combine illustrating our leveling device applied thereto, FIG. 2 is an enlarged perspective view of this invention shown in relation to a fragmentary portion of the combine, FIG. 3 is an enlarged exploded perspective view of the rear axle attachment assembly used with this invention, FIG. 4 is an enlarged rear elevational view of the chaffer showing our invention attached thereto and also showing the shaker shoe below the chaffer with the solid lines indicating a level position of the shoe and the broken lines indicating a tilted position thereof, FIG. 5 is a cross sectional view taken on the line 5—5 of FIG. 4, FIG. 6 is an enlarged elevational view similar to FIG. 4 but showing both the chaffer and sieve, FIG. 7 is a cross sectional view taken on the line 7—7 of FIG. 6, and FIGS. 8 and 9 are schematic views illustrating respectively the horizontal position of the chaffer with the combine tilted, and the chaffer tilted in one direction with the combine tilted in the opposite direction.

Referring to the drawings a combine as seen from the rear is designated generally by the numeral 10, and identified for purposes of this disclosure are the rearward portions of the frame or chassis sides 12 and 14, chaffer 16 and sieve 18 intermediate such sides, and the shaker shoe 20 disposed below the chaffer and sieve. Rearwardly of shoe 20 is the support member 22 which connects at its upper portion to the sides 12 and 14 and at its lower end to a suitable mounting 24 carried by the rear axle 26 as will later be referred to in more detail. The chaffer 16 and sieve 18 at the rear of the combine 10 are a part of the terminal steps in the separating process of the grain and are constructed to be agitated or reciprocated in a well known manner for which the details are not shown as they are not concerned as such with this invention. Conventionally the chaffer 16 and sieve 18 are mounted to the sides 12 and 14 by suitable brackets or shelves so that when the combine is on sloping terrain and the chassis is tilted relative to a horizontal plane, the chaffer and sieve are correspondingly tilted. By our invention, however, the chaffer and sieve are differently mounted than by the heretofore conventional method so that they may be maintained on a level plane irrespective of the tilt of the combine when in operation.

With reference now more particularly to FIGS. 5 and 7, the rear portion of shoe 20 includes the vertical top edge 28 and the lower inclined portion 30 extending downwardly and forwardly from edge 28 and the forward side 32. These parts are utilized in adapting our invention to the combine as follows.

An upstanding post or support 34 is disposed rearwardly of shoe 20 in spaced parallel relationship to the rear shoe edge 28, and the lower end portion 36 of support 34 is appropriately bent or formed so that it can abut the shoe side 30 and be secured thereto by bolts or the like 38. Additional bracing 40 to the sides of shoe 20 may also be provided. Thus, post 34 provides a rigid support attached to shoe 20 and while a slight variance in the configuration of portion 36 is seen in FIGS. 5 and 7, this is merely to accommodate either the chaffer 16 alone (FIG. 5) or both the chaffer 16 and sieve 18 (FIG. 7) as will appear later in more detail and there is in effect no difference in principle or operation.

A stub shaft 42 is secured to the upper portion of support 34 so as to project forwardly therefrom and pivotally receive a bearing member 44 carried at the upper end of a vertically disposed support member such as bar 46 which is closely adjacent the rearward end of the chaffer 16. The chaffer 16, in our invention, is not bracketed or attached to shoe 20 in the conventional manner but rather is secured by strap bolts or the like 48 to a rod or bar 50 that extends beneath the chaffer along its longitudinal center line. The rearward end of rod 50 is secured to bar 46 just below the bearing 44 and the forward end of bar 50 is secured to a vertical bar 52 similar to bar 46 which is pivotally mounted at the top in a bearing 54 in shoe side 32 by means of shaft 56.

At the top of bar 46 we provide the preferably integral rearwardly extending arm 58 to which there is secured the vertically disposed and depending short arm or bar 60. Thus far described it will be appreciated that the chaffer 16 is freely pivotable relative to the shoe 20 and the combine frame chassis by means of its connection to the bearings 44 and 54 and we shall now describe the principal feature of this invention for maintaining the chaffer 16 on a level plane when the combine itself is tilted as when moving over uneven ground.

With reference now more particularly to FIGS. 2, 3 and 5, a crank assembly, indicated generally by the numeral 62 is mounted to the longitudinal central portion of the rear axle 26. Assembly 62 includes a base 64 having a convex portion 66 to nest on axle 26 and be rigidly secured such as by welding 68, and two upstanding spaced bearing members 70 and 72 arranged parallel to the longitudinal axis of the combine 10 so that bearing 70 is substantially over the axle 26 and bearing 72 is forwardly therefrom. A shaft 74 is rotatably journalled through bearings 70 and 72 and on the respective outer sides of such bearings, being the rearward side of bearing 70 and the forward side of bearing 72, it carries the securely affixed respective crank arms 76 and 78. Such arms 76 and 78 are in the form of elongated weights which we preferably show as rectangular blocks, but which may be in any other suitable shape, and they are each secured to shaft 74 at one end portion so that their major length depends vertically therefrom as a pendulum. Being thus arranged, and secured to shaft 74 for rotation therewith, it will be understood that such crank arms 76 and 78 will remain in a vertical position irrespective of any tilted position of axle 26 due to the combine 10 moving over uneven or sloping ground.

Projecting outwardly from the outer side of each crank arm 76 and 78 and from the respective lower portions thereof below the plane of shaft 74 are the securely affixed non-rotatable respective stub shafts 80 and 82. These shafts carry the weight supported by assembly 24 as follows. Assembly 24, for purposes of convenience in assembly, includes the overlapping plates 84 and 86 held together by bolts and nuts 88, with plate 84 being the uppermost to which support member 22 is attached. The free opposed ends of plates 84 and 86 terminate in the downwardly extending respective ears 90 and 92 in which there are the respective bearings 94 and 96. Such bearings 94 and 96 are rotatably mounted respectively on shafts 80 and 82 as seen in FIG. 5. Thus when axle 26 may be on a tilt, with the combine frame tilted correspondingly, assembly 24, which carries support 22 attached to sides 12 and 14, rotates on shafts 80 and 82, as necessary, with the crank arms 76 and 78 remaining vertically disposed as described above. In this respect, the weight transmitted to shafts 80 and 82 from assembly 24 and its attached parts enhances the pendulum-like action of arms 76 and 78 in constantly maintaining a vertical position.

The maintaining of a vertical position of arms 76 and 78 is utilized to maintain the chaffer 16 and sieve 18 on a level plane during a tilted position of the combine 10 in the following manner. A horizontally disposed bar 98 is secured at its longitudinal center to the end portion of shaft 80, preferably by set screw 100 so that it is non-rotatable but can be easily removed, if necessary. Each end portion of bar 98 is provided with a like number of spaced holes to be utilized in pairs and to which like numerals 102, 104 and 106 for corresponding holes in each pair is applied. Each hole of each pair is the same distance from the center of bar 98. Another horizontally disposed bar 108 is rigidly attached at its longitudinal center portion to the rearward side of the arm 60 so that any movement of bar 108 away from a horizontal plane will move the chaffer 16 correspondingly on bearings 44 and 54.

The respective connecting members which are preferably shown as rigid links or rods 110 and 112 are each pivotally attached at respective opposite ends to the respective bars 98 and 108 as seen clearly in FIGS. 2, 4 and 6. In this respect, as will later be referred to in more detail, rods 110 and 112 are attached closely adjacent the respective end portions of bar 108 and when such rods are secured in holes 106 in bar 98, such rods or links are in a parallel relationship. In other words, the points of attachment for rods 110 and 112 on bar 108 is the same distance from the bar center as holes 106 on bar 98. We have thus preferably made bar 108 shorter than bar 98 although this is not necessary if the proper relative positions of the attaching points of rods 110 and 112 is maintained. In moving such rods to the other pairs of holes 102 or 104 on bar 98, they no longer remain parallel and will affect the tilt of the chaffer 16 and sieve 18 as will later appear.

It was mentioned earlier that the chaffer 16 and sieve 18 are designed to be agitated or reciprocated in a forwardly and rearwardly direction and while the apparatus for accomplishing this is not shown as being immaterial to this invention, it is pointed out that bearing 44 is adapted to reciprocate longitudinally of shaft 42, and shaft 56 is similarly arranged relative to bearing 54 to compensate for movement of the chaffer and sieve during agitation, and likewise in this regard the connection between rods 110 and 112 and bar 108 is of a suitable universally pivotal or movable form such as a ball and socket or the like 114.

In the operation of this invention as the combine 10 moves over uneven or sloping ground so as to become tilted relative to a horizontal plane, the crank arms 76 and 78 and their attached shaft 74 are freely rotatable in bearings 70 and 72 so that by their construction and the weight carried by shafts 80 and 82, they constantly maintain a vertical position. This in turn holds bar 98 on a horizontal plane which by its connection through the rigid links 110 and 112 to bar 108, maintains such bar also on a horizontal plane. Thus, with bar 108 operatively attached to chaffer 16, the chaffer is likewise held in a horizontal plane at all times and the shoe 20, through the attached post 34, and bearings 44 and 54 will in effect swing in a small arc relative to the longitudinal axis of rod 50 as tilting positions of the combine are increased or decreased. As a result of this arrangement, the longitudinal side edges of the chaffer 16 are no longer in a fixed and relatively closed contact with the inner sides of frame members 12 and 14 as is conventionally the case and thus in order to prevent the passage of chaff off of the side edges of the chaffer 16 and into the shoe 20, we have connected a flexible stop 116, such as canvas, leather, or the like, between each longitudinal edge of the chaffer 16 and an elevated point on the respective frame sides 12 and 14 as seen in FIG. 4. Members 116 are of sufficient length to allow for relative movement of the chassis to the chaffer side edges and at the same time provide a suitable closure at such edges.

The automatic leveling arrangement described may be applied only to the chaffer 16 or to both the chaffer 16 and sieve 18, and in FIGS. 6 and 7, both the chaffer and sieve are shown thus attached. The sieve 18 is considerably shorter in length than the chaffer although their forward ends are substantially in vertical alignment. For our purposes, the sieve 18 is disassociated from any relatively fixed attachment to frame sides 12 and 14 in its conventional form and is simlarly attached to a rod 118 by bolts 120 as the attachment of the chaffer 16 to rod 50. Rod 118 is the same length as rod 50 and similarly attached at its rearward end to the lower portion of bar 46 and at its forward end to bar 52. Also, both the forward and rear ends of the sieve 18 are connected to the chaffer 16 by a pair of spaced rigid links or straps 122 (FIG. 7) and thus arranged, the sieve 18 is also held in a level position when the combine is running at a tilt. In this arrangement, the flexible stops 116 are extended downwardly to the respective longitudinal edges of the sieve 18 as shown in FIG. 6.

The general purpose of this invention, as is apparent from the foregoing description is to keep grain from piling up at one side of the chaffer when the combine is tilted and while this is generally satisfactorily accomplished by maintaining the chaffer 16 on a level plane (FIGS. 4 and 8) it is sometimes desirable due to the motion and bouncing of the combine to tilt the chaffer 16 slightly away from a level position in a direction opposite to the direction of tilt of the combine for more efficient operation. In such situations we have provided for the adjustment of rod links 110 and 112 as shown in FIG. 9. In this respect it will be noted that the point of attachment of rods 110 and 112 to bar 108 are at fixed points on such rods but may be adjusted between the respective pairs of holes 102, 104 and 106 on bar 98. Consequently, when such rods are attached to the innermost pair of holes 106 on bar 98, as seen in the solid lines of FIGS. 4 and 6, they form, with bars 108 and 98, a parallelogram which is rectangular and thus as the combine tilts (FIG. 8) and bar 60 moves away from a vertical alignment with shaft 74, bar 108 will move laterally relative to bar 98 in the direction of the tilt but will remain level and parallel to the level bar 98. In such moved position, rods 110 and 112 with bars 98 and 108 are still a parallelogram although not rectangular.

By securing rod 110 and 112 in either holes 104 or 102 in bar 98 (illustrated for holes 102 in FIG. 9), a trapezoid is formed with bars 98 and 108 being the parallel members so long as the combine itself is level. However, when the combine is tilted, the formation of rods 110 and 112 and bars 98 and 108 define a trapezium, and with holes 102 being further spaced than the points of attachment of rods 110 and 112 on bar 108, the rod opposite to the direction of tilt will act on the corresponding end of bar 108 to tilt it away from the direction of tilt of the combine. The degree of such reverse tilt can, of course, be varied by the relative length of bar 98 and number of pairs of holes to the fixed spacing on bar 108 at which rods 110 and 112 are attached.

From the foregoing description it is thought that a full understanding of the construction and operation of this invention will be had and the advantages of the same will be appreciated.

We claim:
1. In a combine having a chaffer operatively mounted at the rear thereof over a shaker shoe and said shoe having respective front and rear ends, and a rear axle on said combine, the combination therewith of:
 (a) means pivotally supporting said chaffer at the front and rear ends of said shoe so that said chaffer is normally on a horizontal plane,
 (b) a first horizontally disposed bar operatively secured to said chaffer for pivotal movement therewith,
 (c) a crank arm assembly on said rear axle including a rotatable shaft disposed parallel to the longitudinal axis of said combine,
 (d) a crank arm secured at one end to one end of said shaft for rotation therewith with its major length depending therefrom in a vertical plane,
 (e) said shaft being rotatable relative to said rear axle whereby said crank arm maintains a vertical position irrespective of any tilt of said axle away from a horizontal plane,
 (f) a second horizontally disposed bar connected to the lower end of said crank arm, and
 (g) a pair of spaced parallel rigid link members pivotally connected at respective ends to said first and second bars whereby when said shoe tilts with said combine as on uneven terrain, said bars remain on a horizontal plane to correspondingly hold said chaffer at a horizontal position.

2. In a combine having a chaffer operatively mounted at the rear thereof over a shaker shoe and said shoe having respective front and rear ends, and a rear axle on said combine, the combination therewith of:
 (a) means pivotally supporting said chaffer at the front and rear ends of said shoe so that said chaffer is normally on a horizontal plane,
 (b) a first horizontally disposed bar operatively secured to said chaffer for pivotal movement therewith,
 (c) a crank arm assembly on said rear axle including a rotatable shaft disposed parallel to the longitudinal axis of said combine,
 (d) a crank arm secured at one end to one end of said shaft for rotation therewith with its major length depending therefrom in a vertical plane,
 (e) said shaft being rotatable relative to said rear axle whereby said crank arm maintains a vertical position irrespective of any tilt of said axle away from a horizontal plane,
 (f) a second horizontally disposed bar connected to the lower end of said crank arm,
 (g) a pair of spaced rigid link members pivotally secured at respective ends to said first and second bars, and
 (h) the distance between the points of attachment of said link members on said second bar being greater than the corresponding distance on said first bar whereby when said shoe tilts with said combine in one direction away from a horizontal plane, said first bar together with said chaffer is tilted away from a horizontal plane in the opposite direction.

3. In a combine having a chaffer operatively mounted at the rear thereof over a shaker shoe and said shoe having respective front and rear ends, and a rear axle on said combine, the combination therewith of:
 (a) means pivotally supporting said chaffer at the front and rear ends of said shoe so that said chaffer is normally on a horizontal plane,
 (b) a first horizontally disposed bar operatively secured at its longitudinal center to said chaffer for pivotal movement therewith,
 (c) a crank arm assembly on said rear axle including a rotatable shaft disposed parallel to the longitudinal axis of said combine,
 (d) a crank arm secured at one end to one end of said shaft for rotation therewith with its major length depending therefrom in a vertical plane,
 (e) said shaft being rotatable relative to said rear axle whereby said crank arm maintains a vertical position irrespective of any tilt of said axle away from a horizontal plane,
 (f) a second horizontally disposed bar connected at its longitudinal center to the lower end of said crank arm, and
 (g) a pair of spaced parallel rigid link members pivotally connected at respective ends to said first and second bars at points equidistant from the respective longitudinal centers thereof whereby when said shoe tilts with said combine as on uneven terrain, said bars remain on a horizontal plane to correspondingly hold said chaffer at a horizontal position.

4. In a combine having a chaffer operatively mounted at the rear thereof over a shaker shoe and said shoe having respective front and rear ends, and a rear axle on said combine, the combination therewith of:
 (a) means pivotally supporting said chaffer at the front and rear ends of said shoe so that said chaffer is normally on a horizontal plane, (b) a first horizontally disposed bar operatively secured at its longitudinal center to said chaffer for pivotal movement therewith, (c) a crank arm assembly on said rear axle including a rotatable shaft disposed parallel to the longitudinal axis of said combine, (d) a crank arm secured at one end to one end of said shaft for rotation therewith with its major length depending therefrom in a vertical plane, (e) said shaft being rotatable relative to said rear axle whereby said crank arm maintains a vertical position irrespective of any tilt of said axle away from a horizontal plane, (f) a second horizontally disposed bar connected at its longitudinal center to the lower end of said crank arm, (g) a pair of spaced rigid link members pivotally secured at one respective end to said first bar at points equidistant from the longitudinal center thereof, (h) the other respective ends of said link members similarly secured to said second bar, and (i) the distance between the points of attachment of said link members on said second bar being greater than the corresponding distance on said first bar whereby when said shoe tilts with said combine in one direction away from a horizontal plane, said first bar together with said chaffer is tilted away from a horizontal plane in the opposite direction.

5. In a combine having a chaffer operatively mounted at the rear thereof over a shaker shoe and said shoe having respective front and rear ends, and a rear axle on said combine, the combination therewith of:

(a) means pivotally supporting said chaffer at the front and rear ends of said shoe so that said chaffer is normally on a horizontal plane, (b) a crank arm assembly mounted on said rear axle, (c) said crank arm assembly including a bearing member and a crank arm rotatably secured at one end in said bearing member so as to depend from and remain in a vertical plane irrespective of any tilt of said rear axle away from a horizontal plane, and (d) means connecting said crank arm to said chaffer for acting upon said chaffer to maintain it on a horizontal plane when said combine is tilted away from a horizontal plane.

6. In a combine having a chaffer operatively mounted at the rear thereof over a shaker shoe and said shoe having respective front and rear ends, and a rear axle on said combine, the combination therewith of:

(a) means pivotally supporting said chaffer at the front and rear ends of said shoe so that said chaffer is normally on a horizontal plane, (b) a crank arm assembly mounted on said rear axle, (c) said crank arm assembly including a bearing member and a crank arm rotatably secured at one end in said bearing member so as to depend from and remain in a vertical plane irrespective of any tilt of said rear axle away from a horizontal plane, (d) means connecting said crank arm to said chaffer for acting upon said chaffer to maintain it on a horizonal plane when said combine is tilted away from a horizontal plane, and (e) said last mentioned means being susceptible of adjustment to effect a tilt of said chaffer away from a horizontal plane in a direction opposite to any direction of tilt by said combine.

7. In a combine having a chaffer operatively mounted at the rear theerof over a shaker shoe and said shoe having respective front and rear ends, and a rear axle on said combine, the combination therewith of:

(a) means pivotally supporting said chaffer at the front and rear ends of said shoe so that said chaffer is normally on a horizontal plane, (b) a crank arm assembly mounted on said rear axle and including freely rotatable crank arm means disposed in a vertical plane and capable of maintaining such position irrespective of any tilt of said rear axle away from a horizontal plane, and (c) rigid link means pivotally connected to said crank arm means and said chaffer for acting upon said chaffer respectively to maintain it on a horizontal plane when said rear axle is tilted away from a horizontal plane.

8. In a combine having a chaffer operatively mounted at the rear thereof over a shaker shoe and said shoe having respective front and rear ends and a rear axle on said combine, the combination therewith of:

(a) means pivotally supporting said chaffer at the front and rear ends of said shoe so that said chaffer is normally on a horizontal plane, (b) a crank arm assembly mounted on said rear axle and including freely rotatable crank arm means disposed in a vertical plane and capable of maintaining such position irrespective of any tilt of said rear axle away from a horizontal plane, (c) rigid link means pivotally connected to said crank arm means and said chaffer for acting upon said chaffer respectively to maintain it on a horizontal plane when said rear axle is tilted away from the horizontal plane, and (d) said rigid link means being susceptible of adjustment to effect a tilt of said chaffer away from a horizontal plane in a direction opposite to any direction of tilt by said rear axle.

9. In a combine having a chaffer operatively mounted at the rear thereof over a shaker shoe and said shoe having respective front and rear ends, and a rear axle on said combine, the combination therewith of:

(a) means pivotally supporting said chaffer at the front and rear ends of said shoe so that said chaffer is normally on a horizontal plane, (b) a first horizontally disposed bar operatively secured to said chaffer for pivotal movement therewith, (c) a crank arm assembly on said rear axle including a rotatable shaft disposed parallel to the longitudinal axis of said combine, (d) a crank arm secured at one end to one end of said shaft for rotation therewith with its major length depending therefrom in a vertical plane, (e) said shaft being rotatable relative to said rear axle whereby said crank arm maintains a vertical position irrespective of any tilt of said axle away from a horizontal plane, (f) a second horizontally disposed bar connected to the lower end of said crank arm, and (g) a pair of spaced elongated connecting members pivotally connected at respective ends to said first and second bars whereby when said shoe tilts with said combine as on uneven terrain, said bars remain on a horizontal plane to correspondingly hold said chaffer at a horizontal position.

10. In a combine having a chaffer operatively mounted at the rear thereof over a shaker shoe and said shoe having respective front and rear ends, and a rear axle on said combine, the combination therewith of:

(a) means pivotally supporting said chaffer at the front and rear ends of said shoe so that said chaffer is normally on a horizontal plane, (b) a first horizontally disposed bar operatively secured to said chaffer for pivotal movement therewith, (c) a crank arm assembly on said rear axle including a rotatable shaft disposed parallel to the longitudinal axis of said combine, (d) a crank arm secured at one end to one end of said shaft for rotation therewith with its major length depending therefrom in a vertical plane, (e) said shaft being rotatable relative to said rear axle whereby said crank arm maintains a vertical position irrespective of any tilt of said axle away from a horizontal plane, (f) a second horizontally disposed bar connected to the lower end of said crank arm, (g) a pair of spaced connecting members pivotally secured at respective ends to said first and second bars, and (h) the distance between the points of attachment of said connecting members on said second bar being greater than the corresponding distance on said first bar whereby when said shoe tilts with said combine in one direction away from a horizontal plane, said first bar together with said chaffer is tilted away from a horizontal plane in the opposite direction.

References Cited by the Examiner
UNITED STATES PATENTS

| | | |
|---|---|---|
| 1,056,128 | 3/13 | Schuett. |
| 1,851,410 | 3/32 | Thoen. |
| 2,488,592 | 11/49 | Hamilton et al. |
| 2,675,809 | 4/54 | Aber et al. _____ 209—416 |
| 2,691,444 | 10/54 | Oliver _____ 209—416 |

HARRY B. THORNTON, *Primary Examiner.*

HERBERT L. MARTIN, *Examiner.*